(12) United States Patent
Kumar et al.

(10) Patent No.: US 8,930,390 B2
(45) Date of Patent: Jan. 6, 2015

(54) MOUSE GESTURE ASSISTED SEARCH

(75) Inventors: Kalyan K. Kumar, Bangalore (IN);
Aravindan Raghuveer, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 655 days.

(21) Appl. No.: 12/900,595

(22) Filed: Oct. 8, 2010

(65) Prior Publication Data

US 2012/0089582 A1 Apr. 12, 2012

(51) Int. Cl.
*G06F 17/30* (2006.01)
*G06F 3/0354* (2013.01)
*G06F 3/01* (2006.01)

(52) U.S. Cl.
CPC ............ *G06F 3/03543* (2013.01); *G06F 3/017* (2013.01)
USPC ........... 707/765; 707/728; 707/805; 715/780; 715/810; 715/863

(58) Field of Classification Search
CPC .............................. G06F 3/017; G06F 3/03543
USPC ........... 707/765, 728, 805; 715/780, 810, 863
See application file for complete search history.

(56) References Cited

U.S. PATENT DOCUMENTS

| | | | | |
|---|---|---|---|---|
| 6,088,481 A | * | 7/2000 | Okamoto et al. ............. | 382/189 |
| 6,385,602 B1 | | 5/2002 | Tso et al. | |
| 7,523,095 B2 | * | 4/2009 | Gates et al. ............................ | 1/1 |
| 7,539,669 B2 | * | 5/2009 | Broker .................. | 1/1 |
| 7,603,349 B1 | * | 10/2009 | Kraft et al. ............................ | 1/1 |
| 2007/0106953 A1 | * | 5/2007 | Forstall et al. ................ | 715/779 |
| 2009/0193352 A1 | * | 7/2009 | Bunn ............................ | 715/780 |
| 2010/0005428 A1 | * | 1/2010 | Ikeda et al. ................... | 715/863 |
| 2010/0211564 A1 | * | 8/2010 | Cohen et al. .................. | 707/722 |
| 2011/0010676 A1 | * | 1/2011 | Khosravy et al. ............. | 715/863 |
| 2011/0270864 A1 | * | 11/2011 | Mital et al. .................... | 707/767 |

OTHER PUBLICATIONS

Yang Li, "Gesture Search: A Tool for Fast Mobile Data Access", U-IST'10, Oct. 3-6, 2010, New York, New York, USA.*
"Mouse Gestures Redox:: Home," Mozilla Firefox Mouse Gestures Plug-in, Apr. 1, 2010, pp. 1 and 2.

* cited by examiner

*Primary Examiner* — Shew-Fen Lin
(74) *Attorney, Agent, or Firm* — Buchenhorner Patent Law (57) ABSTRACT

A system and method for method for performing a web search by a search engine for content including: providing a first search results page to a user in response to a search query; providing an interface for submission of an input action representing a search command, wherein the interface is associated with the search results page; receiving the input action; reformulating the search query to incorporate the search command represented by the input action; and providing a second search results page to the user in response to the reformulated search query.

17 Claims, 13 Drawing Sheets

*FIG. 1*

*Prior Art*

FIG. 2a - QA GESTURE

FIG. 2b

FIG. 3 - Hot News / Gossip Gesture

FIG. 4 – SOCIAL SEARCH GESTURE

FIG. 5 – Filter App Gesture

FIG. 6a - TABULAR VIEW GESTURE

| Item Name | Image | Description | Resolution | Color Support | Pixels |
|---|---|---|---|---|---|
| Nikon D90 | X | Now is the time for new creativity, and to rethink what a digital SLR ... | 12.3 megapixel | Color | 10,750,000 |
| Nikon D5000 | X | Meet the D5000, a breed of Nikon digital SLR camera. A wonderful ... | 12.3 Megapixel | Color | 12,900,000 |
| Nikon D700 | X | With the D700 there's no compromise between price and capabilities ... | 12.1 Megapixel | Color | 12,870,000 |
| Nikon D3000 | X | The D3000 is a high-performance DX format SLR that delivers ... | 10.2 megapixel | Color | 10,750,000 |
| ... | ... | ... | ... | ... | ... |
| ... | ... | ... | ... | ... | ... |

FIG. 6b - Tabular view

FIG. 6c – TimeLine View Gesture

| Name | Gesture Pattern | Alternate Input | Search Engine Action | Query Level Use Case |
|---|---|---|---|---|
| | | | Intent Dimension | |
| QA Gesture | ? - question mark | CTRL + "?" | Selects results from Q&A, discussion forums, how-to pages only | Question or opinion type queries |
| Hot News | "N" | CTRL + "N" | Hottest breaking news related to the query | Celebrity Search |
| Social Search | S - "S" pattern | CTRL + "S" | Search on tags of flickr contacts, tweets of contacts, updates from contacts on MySpace and Facebook | Contact for reviews |
| | | | Presentation Dimension | |
| Tabular View | 7 - number 7 | CTRL + "7" | Retrieves results from query; then retrieves the set of common metadata across a majority of search results | A tabular view summarizing results |
| Timeline View | 0 - zero | CTRL + "0" | Results ordered based on timeline; slider bar | Trending of a news item over time |
| | | | Search Toolkit Dimension | |
| Filter | | - Vertical Line Up | CTRL "|" | A tool is presented to the user wherein he can give the range of price and the user rating of the product he is interested in | Narrow down a product range |

MOUSE GESTURE ASSISTED SEARCH

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of search and more particularly relates to the field of using mouse gestures to enrich the search experience.

BACKGROUND OF THE INVENTION

An internet search engine is a gateway to the immense amount of information available on the Web. Search engines are very efficient at providing users with access to a staggering quantity of information in the form of search results. The user, however, is often more interested in the relevancy of the search results, rather than the quantity of the search results.

Figure 1:
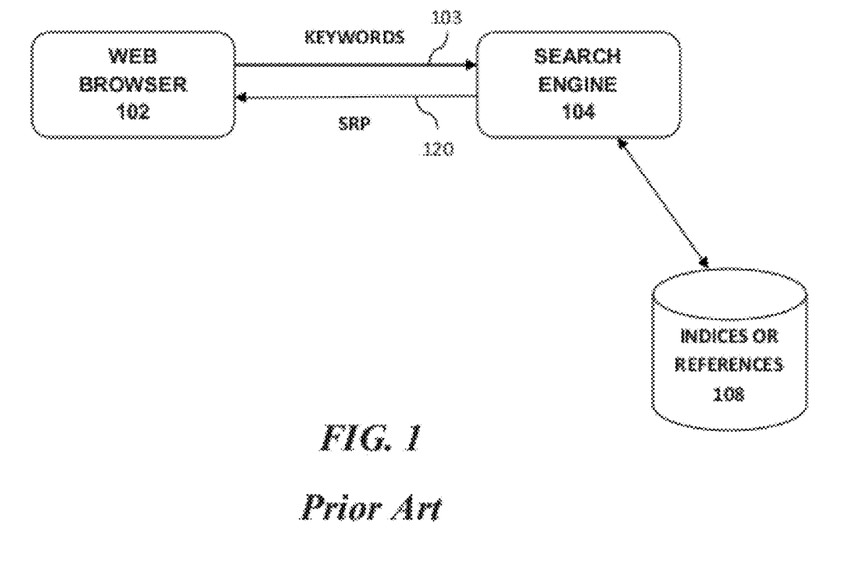
FIG. 1 is a block diagram of a simplified search system, according to the known art.

Search engines are keyword-driven. Referring to FIG. 1 there is shown a basic block diagram of a generalized search system 100. A very abbreviated overview of the working of a search engines is as follows: a user inputs a string of one or more characters representing a keyword 103 or set of keywords, separated by delimiters such as spaces or commas, into a search site on available on the user's web browser 102. The search engine 104 then processes the keywords as a search query by parsing and indexing. Next the search engine 104 accesses multiple indices or references 108 throughout the Internet for "matches" and returns any matches found as one or more "hits" on a search result page (SRP) 120. These hits are pages of interest provided from the millions of pages that are available on the Web.

A search hit is an atomic unit that the search engine 104 identifies as matching the criteria defined by the search query. These hits are presented to the user as search results, but the "hits" may not be what the user had in mind. This presents one of the most formidable challenges faced by search engines today—discovering the intent of the query in order to provide a more meaningful search result. This challenge arises due to two fundamental limitations of the current state-of-art: 1) by using keywords, the user can say only so much about what he/she expects from the search engine; and 2) an average user may not know the correct kind of keywords to use and the advanced tweaks to get the results he/she wants.

For example, some search providers feature additional pages on their website to which a user can navigate for more relevant search results. For example, a user can input the search term "World Cup 2010" on the Yahoo! website at www.yahoo.com and be presented with multiple search results. However, a more rewarding search experience awaits the user who navigates to the Yahoo! Sports page at http://sports.search.yahoo.com and enters the same search term. Not every user however, knows how to access these more content-rich pages available on the sidelines of the main search page, but it is certain that every user would prefer more relevant search results.

Therefore, there is a need for a system and method to overcome the above-stated shortcomings of the known art.

SUMMARY OF THE INVENTION

Briefly, according to an embodiment of the invention a method for performing a web search by a search engine includes steps or acts of: providing a first search results to a user in response to a search query; providing an interface for submission of an input action representing a search command, wherein said interface is associated with the search results page; receiving the input action; reformulating the search query to incorporate the search command represented by the input action; and providing a second search results page to the user in response to the reformulated search query.

In an another embodiment of the present invention, a compute readable medium contains program code that includes instructions for: receiving a first search results page provided to a user in response to a search query; providing an interface for submission of an input action representing a search command; receiving the input action; reformulating the search query to incorporate the search command represented by the input action; and providing a second search results page to the user in response to the reformulated search query.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a system and method to enrich a user's search experience by invoking additional search actions. These additional search actions are invoked through input means such as proprietary "gestures" that empower the user to better communicate his/her query intent to a search engine. The "gestures" may be made by inputting keyboard characters or by producing shapes by directed cursor movement, such as with a computer mouse. Additionally, gestures may be produced by cursor movement facilitated by a trackball, cursor direction keys (as used in Unix operating systems), and other forms of cursor movement.

Additionally, the input action used to invoke search actions may not involve cursor directed movement at all. Instead the input actions can be performed through keyboard commands and haptic interaction with a touch screen interface on a mobile digital device such as the iPad™ or iPhone® devices by Apple®.

A key contribution of this invention is the notion of using input actions such as mouse gestures for refining and communicating query intent and result presentation. Some advantages are:

1. empowering the search engine user with more ways of selecting the type and presentation of the information provided by the search results page (SRP) beyond the typical keyword query results by communicating the user's intent to the search engine;

2. facilitating more user engagement through fewer keyboard actions, and freeing the user from guessing which keyword/descriptors will yield the correct results; and 3. simplifying the search experience because the user does not need to know complex querying tricks.

In the following description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. It is to be further understood, that the examples given in the figures are just illustrations of the general working of the present invention and that only features relevant for the understanding of it are shown. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

For exemplary purposes we describe the addition of mouse gestures to the YAHOO!® search results page (Y! SRP). It should be noted that embodiments of the invention can be advantageously incorporated into other search engine sites as well. By adding the mouse gestures functionality to the search results page (SRP), we provide three additional dimensions for the user to control the results he/she sees on the search results page. The three dimensions are: 1) Query Intent Dimension; 2) Presentation Dimension; and 3) Search Toolkit Dimension.

1. Query Intent Dimension: through mouse gestures, the user can specify what he/she is looking for beyond what the SRP provides. For example, a) is the user looking to buy a camera and would like to see reviews, prices and where to buy? or b) is the user doing a celeb search and wants to read the latest gossip? The query intent dimension provides the reason, or intent, for the query.

2. Presentation Dimension: through mouse gestures, the user can specify how the information should be presented. Any one presentation design does not suit all kinds of results. As an example, the traditional "ten blue links" is a one-size-fits-all presentation approach which doesn't address many possible use situations. For example, considers these possible use situations:

a. comparison of the price, rating, images of a product class for future purchase;

b. trending of a news item; and c. any new innovation that the search engine performs on the presentation front.

The mouse gestures provide the user with the power to pick and choose the kind of presentation he/she would like best for a query.

3. Search Toolkit Dimension. This provides search tools for task completion. This dimension provides a particular set of tools to use on the SRP for narrowing search results. Due to the lack of space on the SRP, all of the tools provided by the search engine cannot be displayed on the SRP. We provide the search tools on the left navigation bar in one embodiment. The search tools can be used to search by certain attributes such as product price, reviews, and so forth.

Figure 2A:
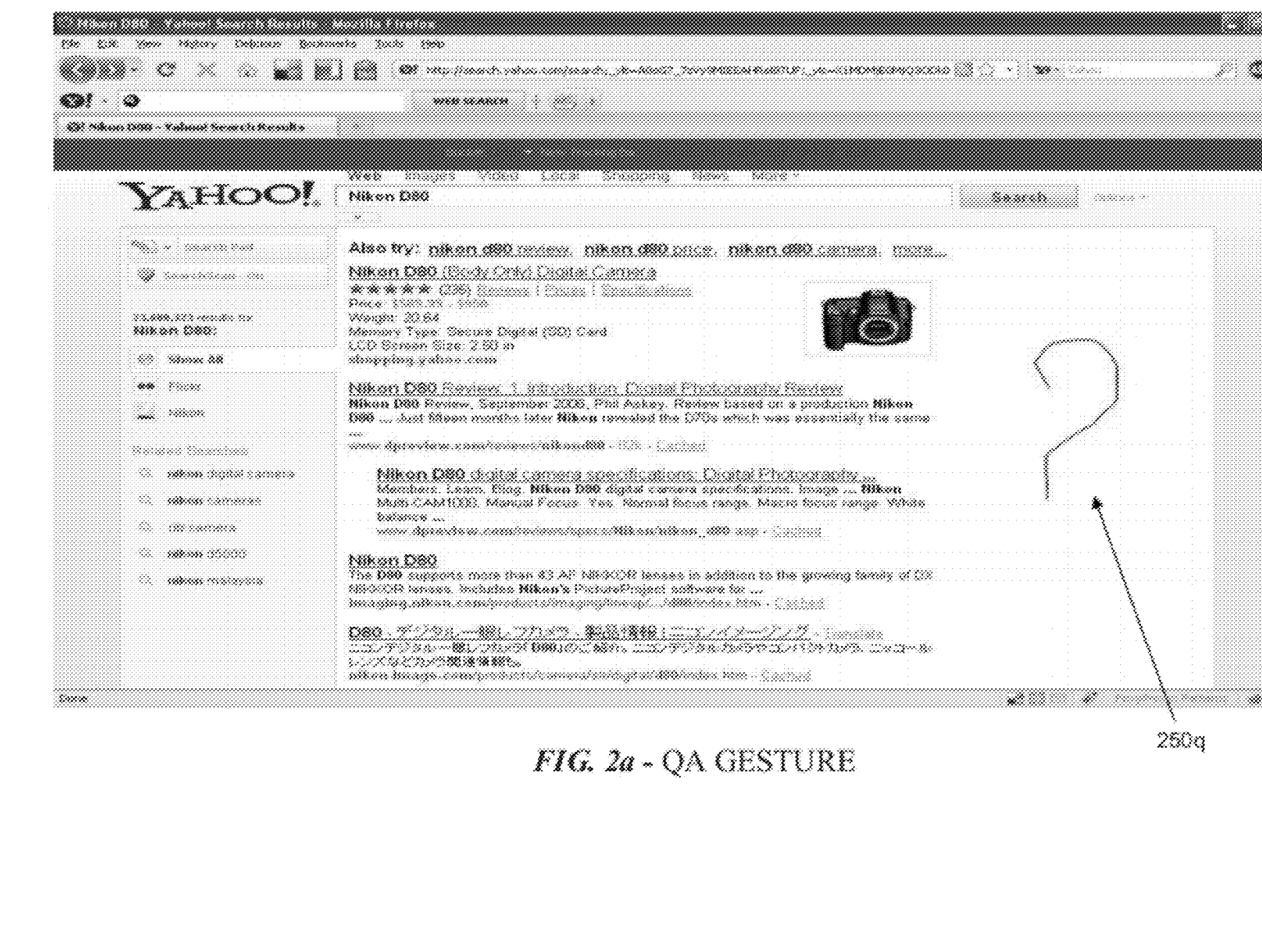
FIG. 2a shows a Q&A mouse gesture, according to an embodiment of the present invention.
Figure 7:
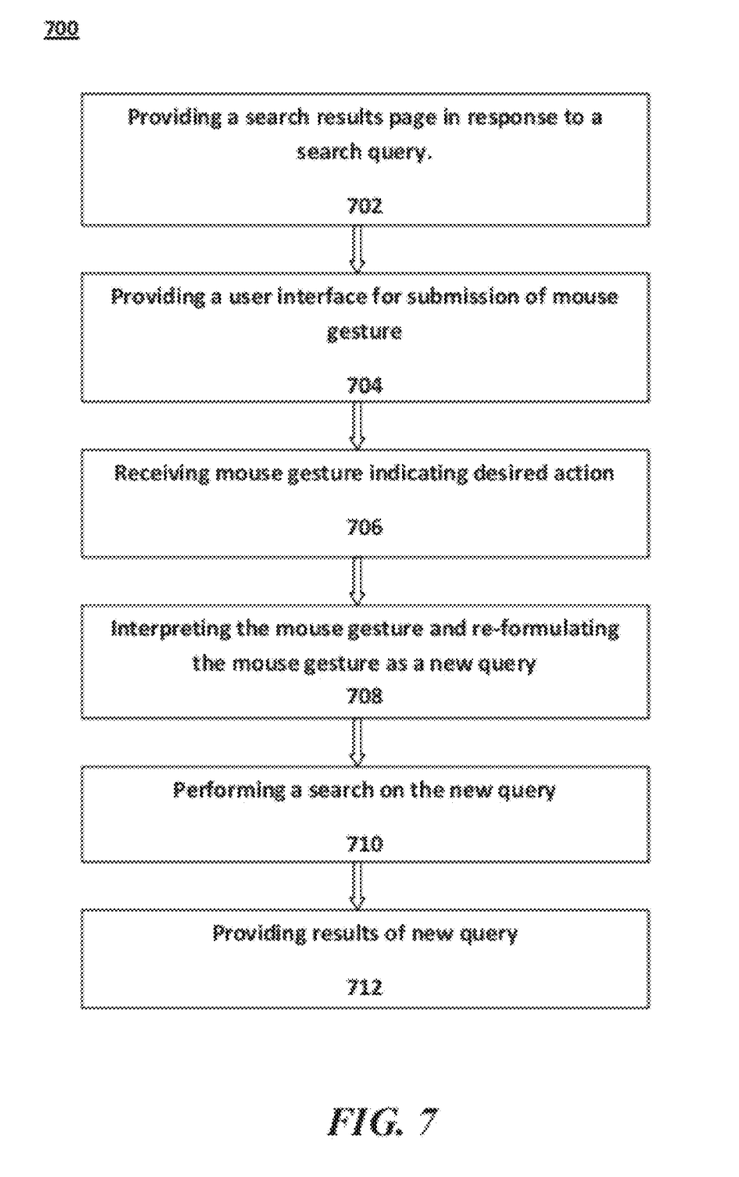
FIG. 7 is a flowchart of a method operating according to an embodiment of the invention.

Referring now to FIG. 7 there is shown a flowchart 700 of a method according to an embodiment of the present invention. In the first step 702, the search engine provides a search results page (SRP) to a user in response to a search query, such as the SRP shown in FIG. 2a. On this SRP, the search engine also provides an embedded user interface wherein the user can submit a mouse gesture at step 704. Note that this user interface can simply be an available space on the SRP itself or a toolbar as will be described with respect to FIG. 12. In the example of FIG. 2a the user interface is the available space on the right-hand side of the SRP. In FIG. 2a we show the Q&A mouse gesture provided to the right of the search results.

In step 706 the search engine receives the input action such as a mouse gesture indicating the user's desired action with respect to the SRP. The input action represents a command specifying a further search action to be taken. The search engine interprets and re-formulates the original search query to incorporate the command represented by the input action as a new search query in step 708.

Figure 2B:
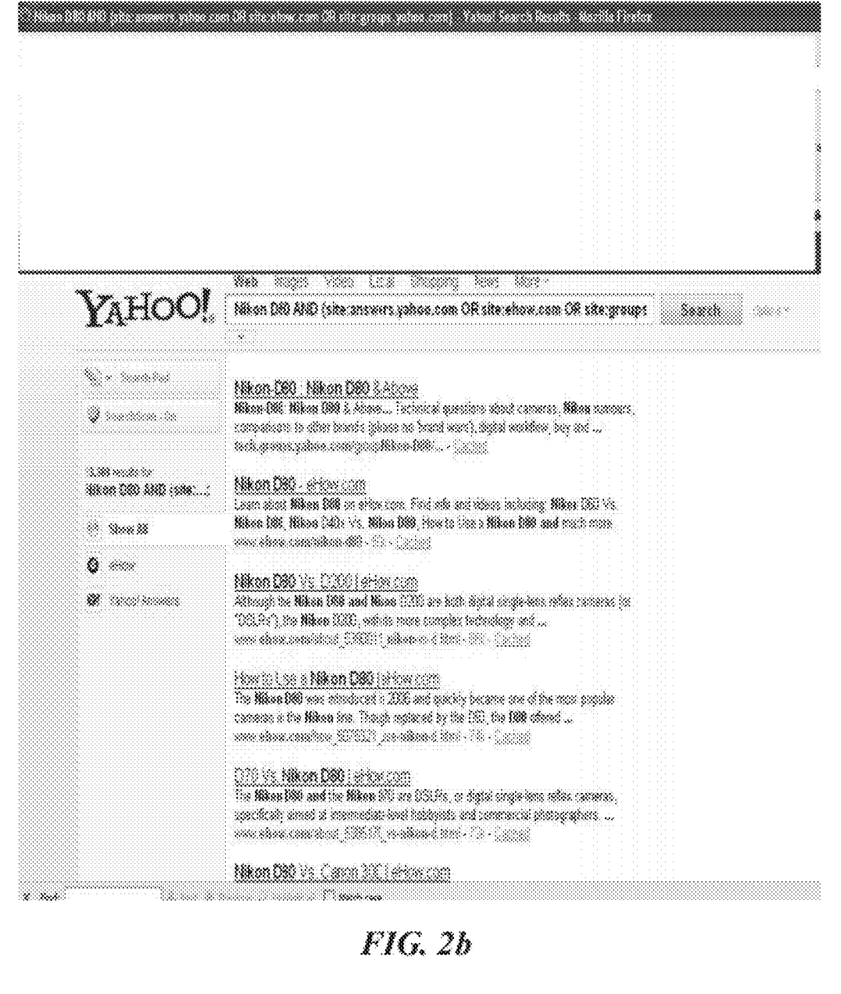
FIG. 2b shows the SRP after the search query of FIG. 2a was re-formulated to include Q&A websites, according to an embodiment of the present invention.

Query reformulation can happen in many ways. One example/embodiment as shown in FIG. 2b is that we search for the same keywords as in the original query, only we restrict the search sites to a subset of sites matching the input action command. For example, the input action in the example of FIG. 2b is the Q&A mouse gesture which specifies search results limited to Q&A topics. Therefore, the search sites were limited to Q&A sites such as answers.yahoo.com, ehow.com. groups.yahoo.com, and www.wikihow.com. In step 710 the search engine then performs another search using the new re-formulated query. Lastly, in step 712, the search engine provides the result of the new query. We see this result in FIG. 2b. Note that the original search was re-formulated to specify Q&A sites.

Figure 9:
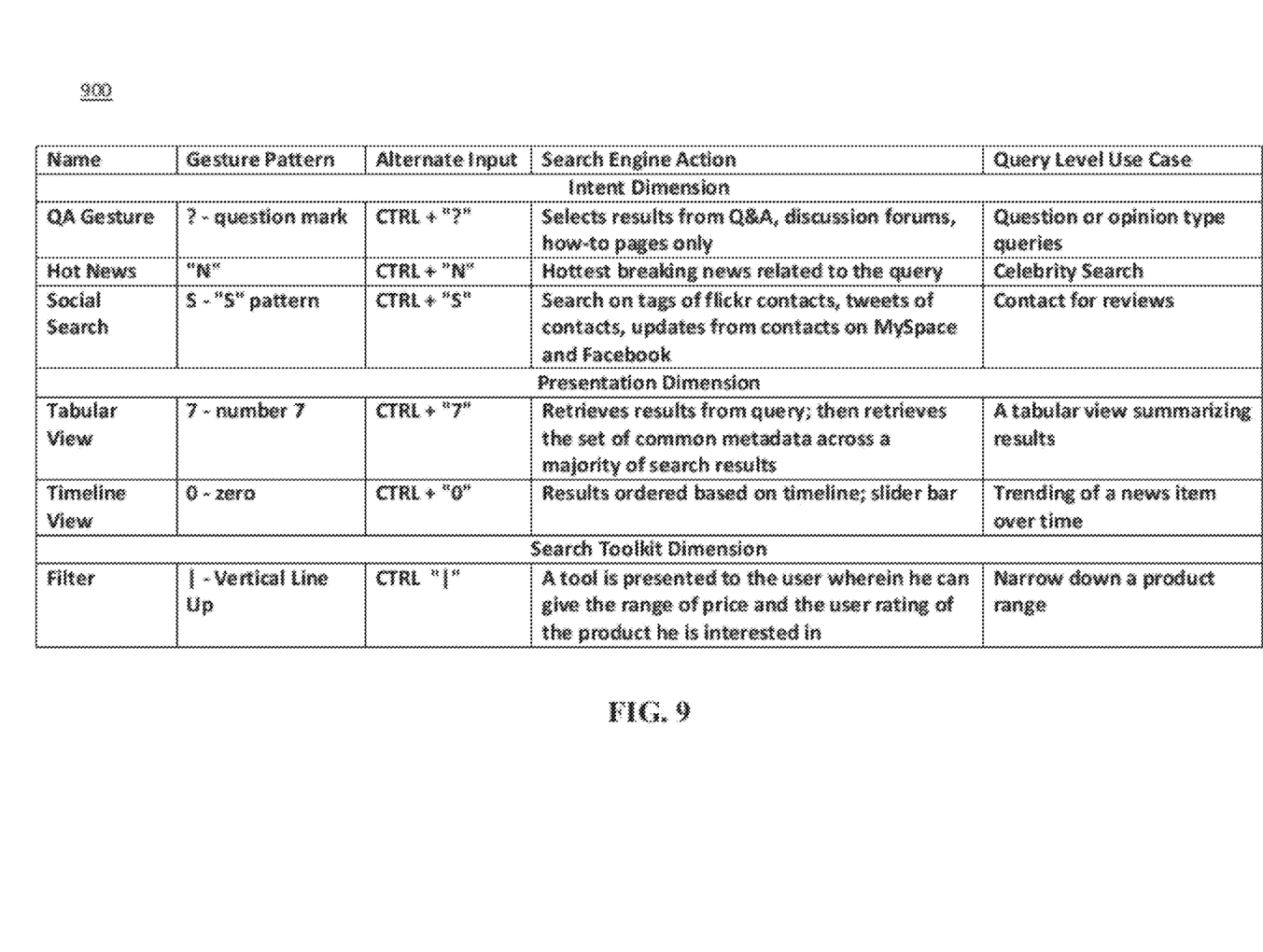
FIG. 9 is a table showing the intent and presentation dimensions of mouse gestures, according to an embodiment of the present invention.

Referring now to FIG. 9, we present several use cases for SRP mouse gestures in tabular form 900. Each use case will be presented in the following format:

1. Name: Mouse Gesture.
2. Gesture Pattern: The pattern the user will draw using the mouse for invoking this mouse gesture action.
3. Alternate input: the keyboard shortcut alternate to the mouse gesture.
4. Search Engine Action: What the search engine will do if the user performs the given mouse gesture.
5. Query Level Use-Case: What are example queries where this mouse gesture will be useful?

Also we split the use cases into three subdivisions based on the end goal of the mouse gesture:

A. Intent Dimension: Where the mouse gesture communicates to the search engine a specific intent.
B. Presentation Dimension: Where the mouse gesture calls for a different "view" of presenting the search results.
C. Search Toolkit Dimension: Where the mouse gesture helps add tools to the SRP.

A. Intent dimension.

A1. Name: Q&A Gesture—See FIG. 2a for an example of the use of the Q&A mouse gesture 250q.

Mouse Gesture Pattern: "?" The user directs cursor movement to "draw" a shape similar to a question mark to the right of the search results.

Alternate Input: using the keyboard shortcut CTRL+"?" provides the same result as the above mouse gesture pattern.

Search Engine Action: Starting from the original search query which in this example is a camera model Nikon D80, the search engine selects results from question and answer (Q&A) sessions, discussion forums, and how to pages for the Nikon D80. See FIG. 2b.

Query Level Use Case: question or opinion type queries.

Figure 3:
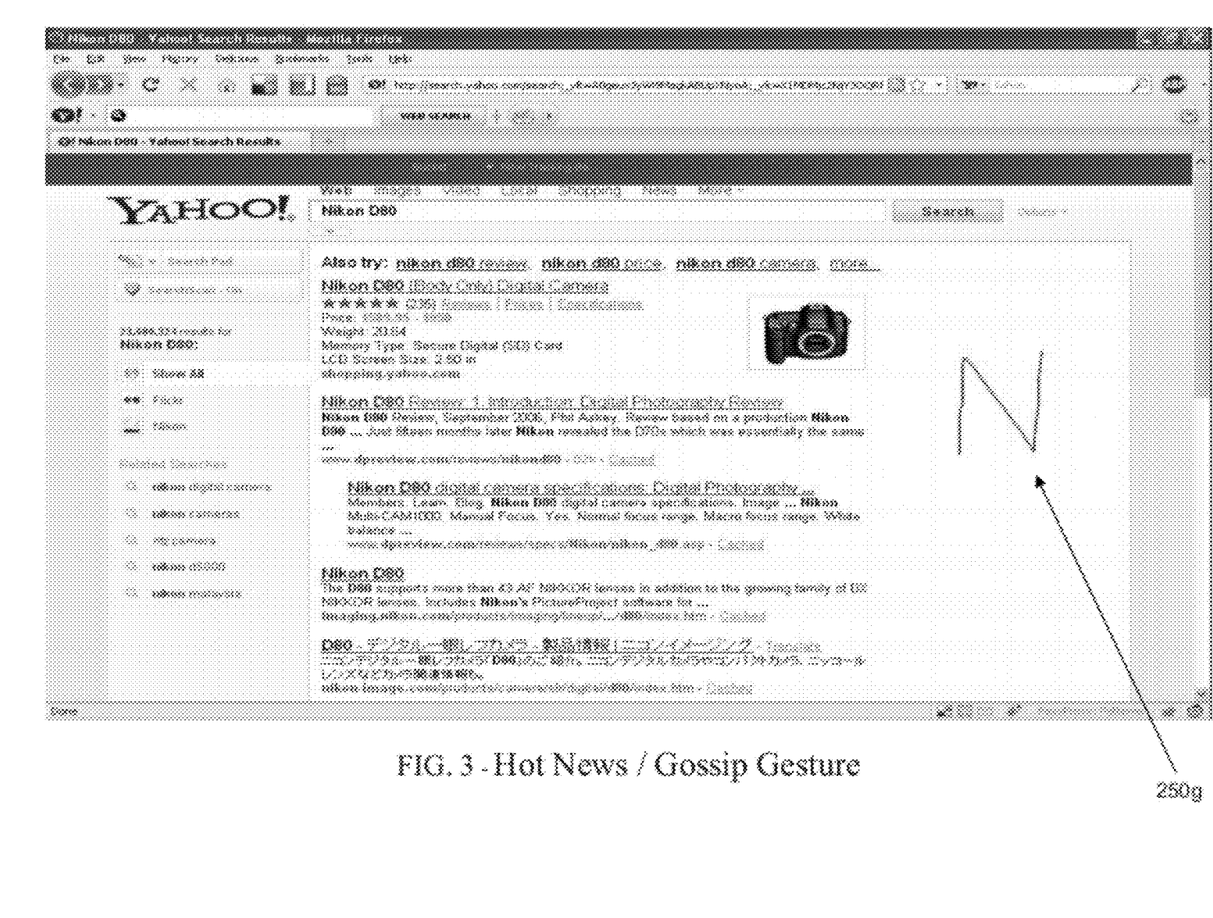
FIG. 3 shows a Hot News mouse gesture, according to an embodiment of the present invention.

A2. Name: Hot News Gesture—See FIG. 3 for an example of the use of the Hot News mouse gesture 250g.

Mouse Gesture Pattern: "N" The user directs cursor movement to "draw" a shape similar to the letter "N" to the right of the search results.

Alternate Input: using the keyboard shortcut CTRL+"N" provides the same result as the above mouse gesture pattern.

Search Engine Action: Starting from the original search query, the search engine selects results from any hottest breaking news related to the original query.

Query Level Use Case: celebrity search

Figure 4:
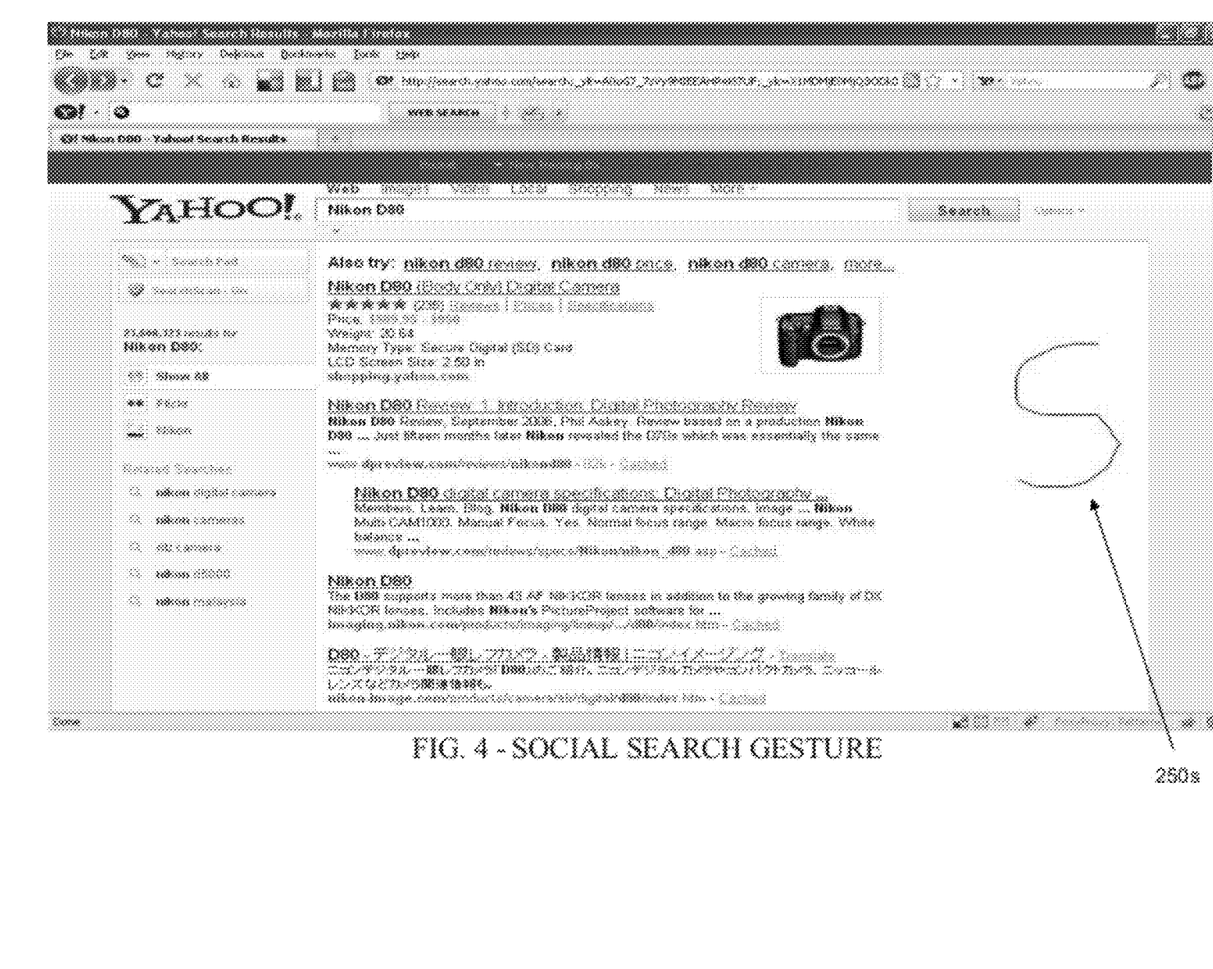
FIG. 4 shows a Social Search mouse gesture, according to an embodiment of the present invention.

A3. Name: Social Search—See FIG. 4 for an example of the use of the Celebrity Search mouse gesture 250s.

Mouse Gesture Pattern: "S" The user directs cursor movement to "draw" an "S" pattern to the right of the search results.

Alternate input: using the keyboard shortcut CTRL+"S" provides the same result as the above mouse gesture pattern.

Search Engine Action: Starting from the original search query, the search engine selects results from the user's contacts (by mining Outlook or other contacts) and tags of social networking sites such as Flickr®, Twitter™, Myspace™, and facebook that are related to the original query.

Query Level Use-Case: For example, a user searches for Nikon D80 in the "S" mode. Then, if he/she finds his/her contact has taken photos using a Nikon D80 camera on Flickr® or had tweeted/updated his facebook page that he got a Nikon D80, the user can contact the friend directly to find reviews of the camera.

B: Presentation dimension

Figure 6A:
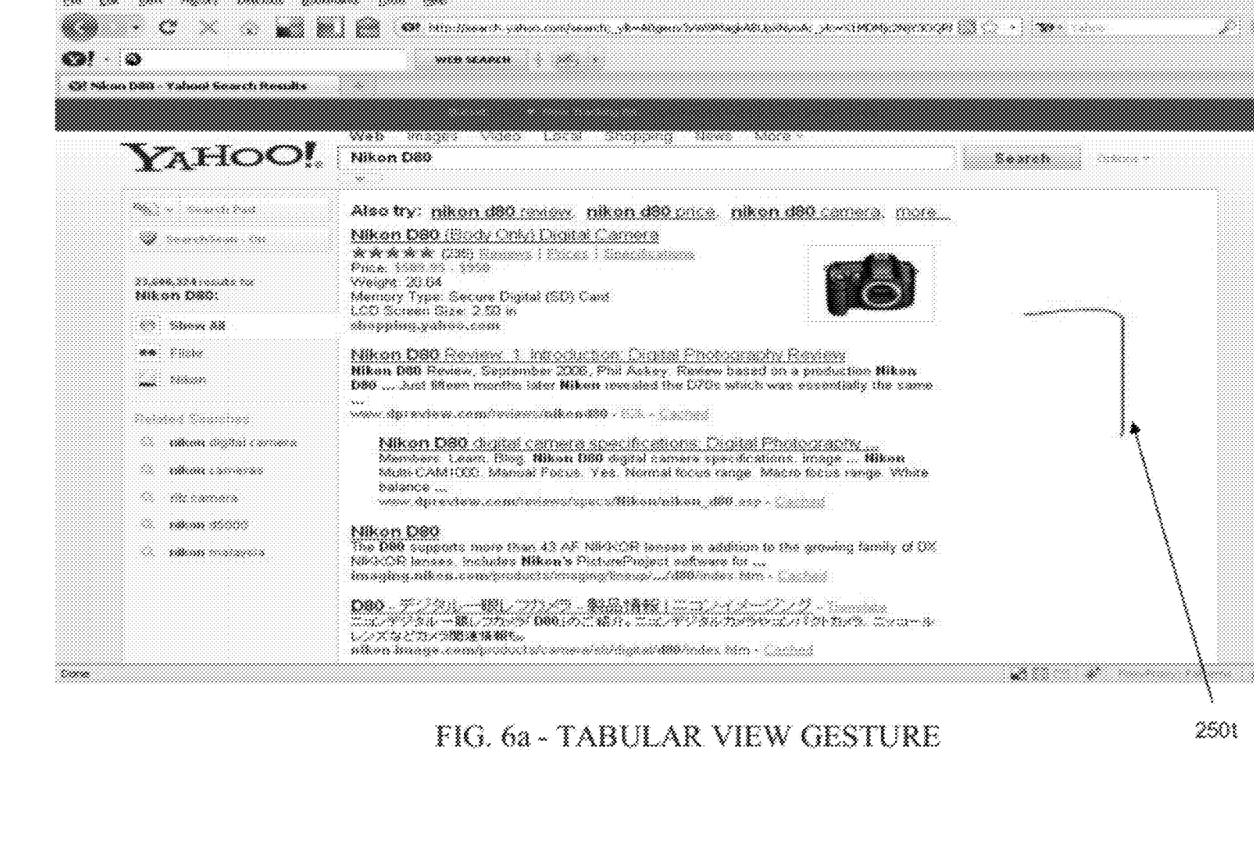
FIG. 6a shows a Tabular View mouse gesture, according to an embodiment of the present invention.

B1: Name: Tabular View—See FIG. 6a for an example of the use of the Tabular View mouse gesture 250t.

Gesture Pattern: "7" The user directs cursor movement to "draw" the number 7 to the right of the search results.

Alternate input: using the keyboard shortcut CTRL+"7" provides the same result as the above mouse gesture pattern.

Figure 6B:
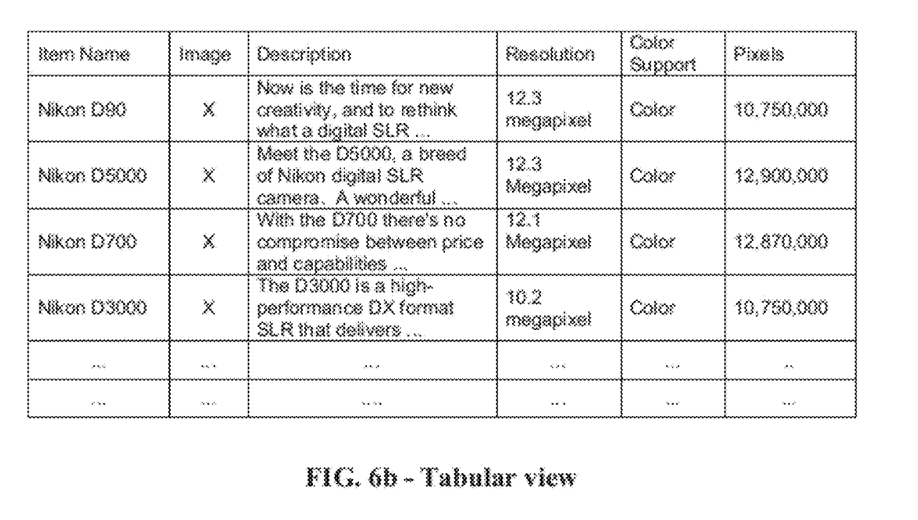
FIG. 6b shows an exemplary table generated from the mouse gesture of FIG. 6a, according to an embodiment of the present invention.

Search Engine Action: Starting from the original query, the search engine retrieves results as usual. It then retrieves the set of meta-data/attributes present across a majority of search results. The common set of attributes forms the columns in the tabular view. Each search result will be a row in the tabular view. Note: Y! has technologies in production like Vertex (http://twiki.corp.yahoo.com/view/Extplat/) that add structured metadata to URLs. In this use case, the metadata added by Vertex could be the columns in the tabular view. See FIG. 6b for an example.

Query Level Use-Case: The user searches for Nikon cameras. The result the search engine provides would be different models of Nikon cameras. If there are enough attributes like model number, price, optical zoom, rating for each link in the search result, a tabular view summarizing the results in the page can be shown.

Figure 6C:
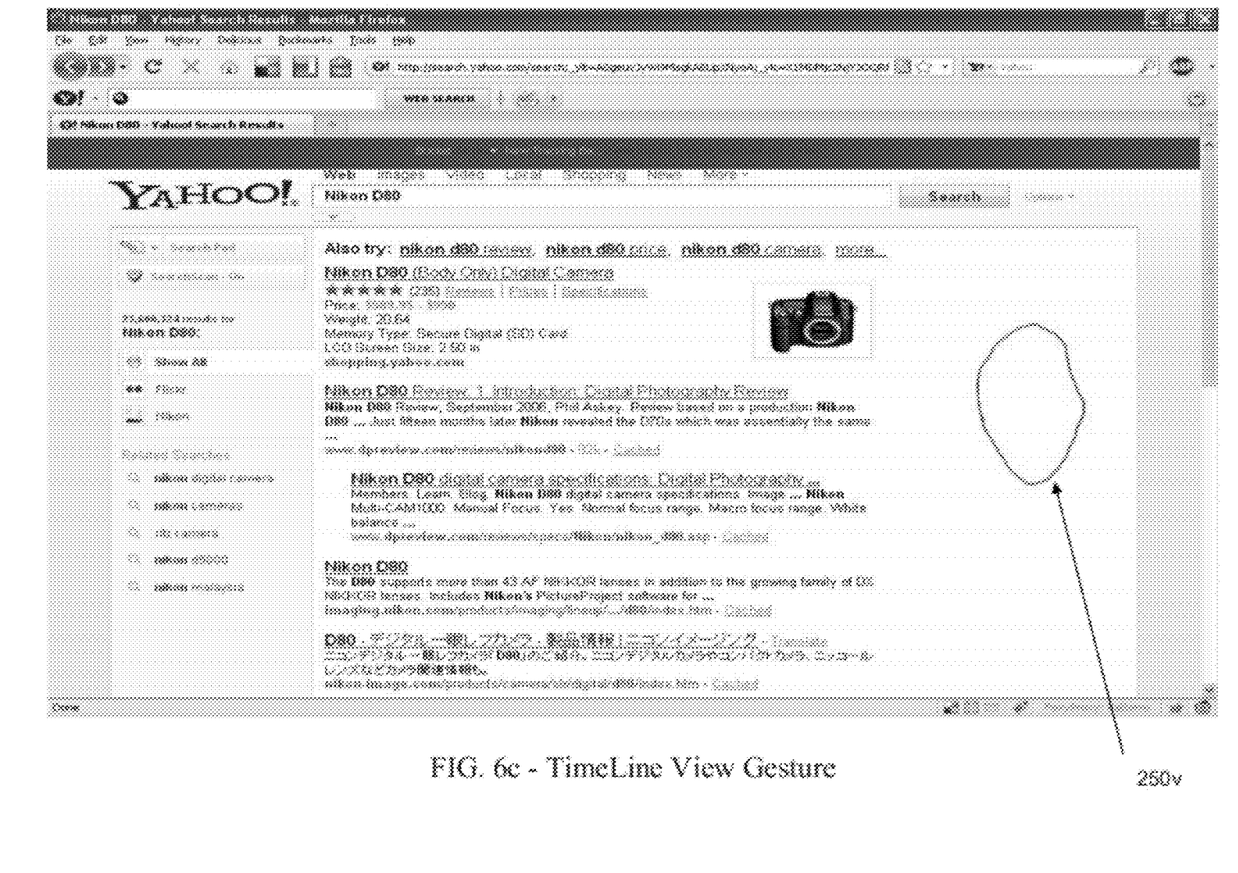
FIG. 6c shows a Timeline View mouse gesture, according to an embodiment of the present invention.

B2. Name: Timeline View Gesture—See FIG. 6c for an example of the use of the Timeline View mouse gesture 250v.

Gesture Pattern: "0" The user directs cursor movement to "draw" the number zero to the right of the search results.

Alternate Input: using the keyboard shortcut CTRL+"0" provides the same result as the above mouse gesture pattern.

Search Engine Action: Starting from the original search query, the search engine selects results that are ordered based on a timeline-like time of crawl of the page. This view is most ideally suited for news pages. A slider bar is present in this embodiment to enable the user to choose the time duration he/she is interested in. The slider bar may be implemented as a basic horizontal slider with tick marks marking predefined intervals at which the slider thumb will stop as it's dragged Query Level Use-Case: Trending of news related to the search query over a time period that can be selected by the user.

Search Toolkit Dimension.

Figure 5:
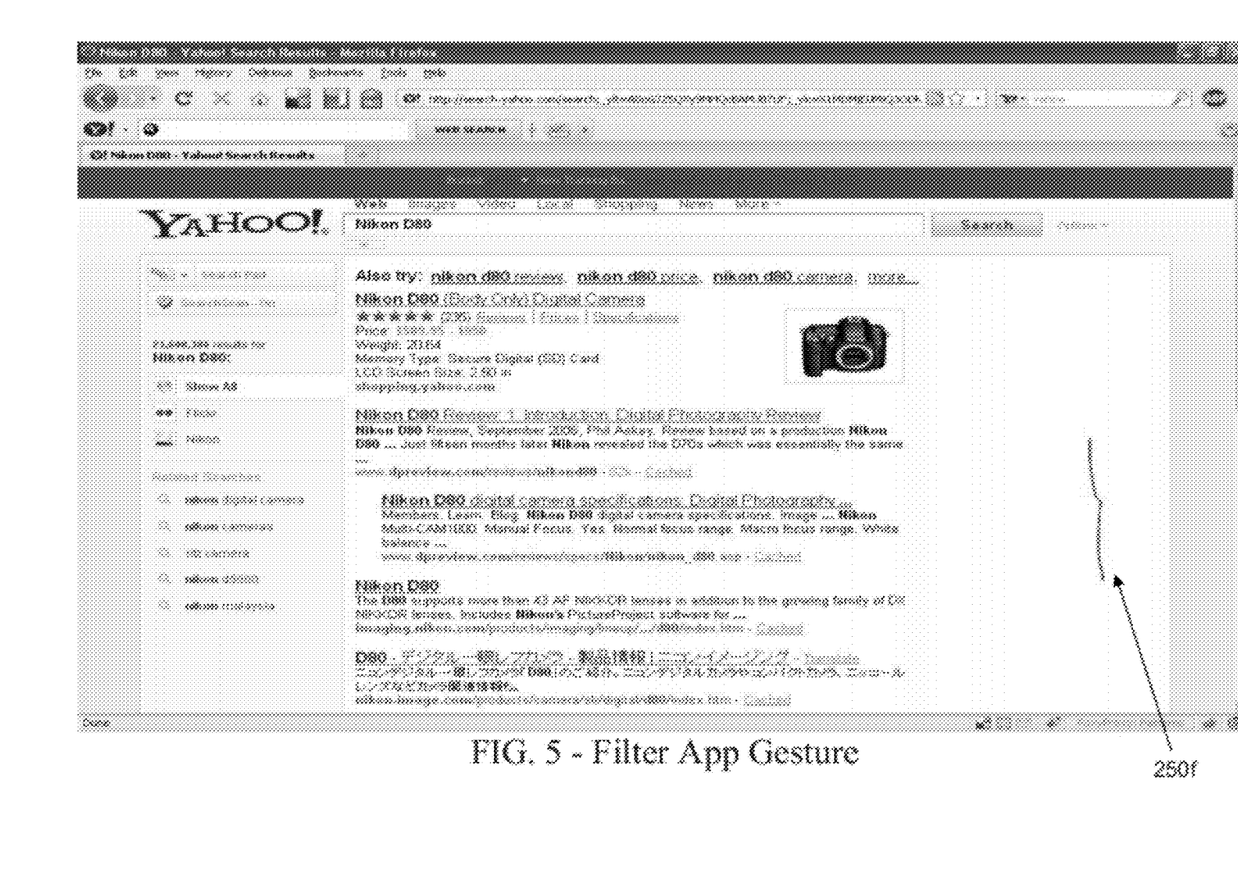
FIG. 5 shows a Filter App mouse gesture, according to an embodiment of the present invention.

C1: Name: Filter Gesture—See FIG. 5 for an example of the use of the Filter mouse gesture 250f.

Gesture Pattern: "|" The user draws a vertical line from bottom to top to the right of the search results.

Alternate Input: using the keyboard shortcut CTRL+"F" provides the same result as the above mouse gesture pattern.

Figure 10:
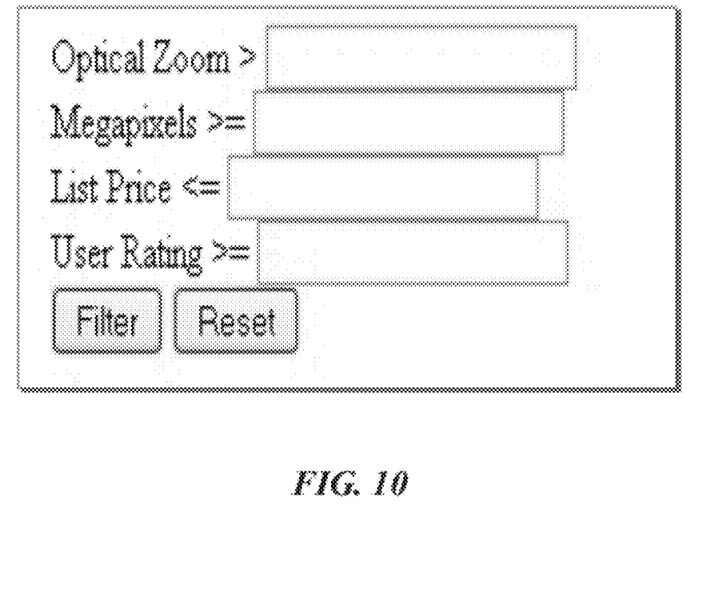
FIG. 10 shows an exemplary filter tool invoked with the mouse gesture of FIG. 5, according to an embodiment of the present invention.

Search Engine Action: A tool is presented to the user wherein he/she provide at least one attribute for narrowing a product search, such as the range of prices or the user rating of the product in which he/she is interested. This tool can help the user narrow down, or filter, the set of products in which he/she is interested. Using the example of a camera search, FIG. 10 shows an exemplary filter tool that allows the user to input attributes for the desired product. For example, if the user wants to narrow the search to those cameras with an optical zoom greater than 4×, then that value would be entered into the optical zoom field.

Query Level Use Case: narrow a product search.

Implementation On Search Results Page.

To be least intrusive, the mouse gestures can be an additional layer over the existing SRP, such as the example shown in FIG. 2b (i.e., the user searches by typing a query in the search box and clicking on the search button as usual). Once the results present themselves, the user can then choose to execute a mouse gesture, or alternate input, to further refine either his/her search intent or the form of presentation. A default mouse gesture such as a "-" (the user draws a horizontal line) can be used to take the user back to the original SRP. It should be noted that although the example of FIG. 2b shows a traditional SRP, the invention can be advantageously used with any type of search, such as image and video search.

Interface.

In an embodiment of the present invention, the interface for receiving the mouse gesture is embedded into the SRP and is not visually seen by the user. When a user enters an input action the interface communicates the input action to the back-end processing. In one form of the interface, the user is presented with a help page linked out of the SRP page with a list of mouse gestures that the interface supports. A separate non-embedded user interface such as a toolbar can be advantageously used, but is not required.

In a particularly advantageous embodiment of the present invention, the user is able to layer one type of mouse gesture result over the other. For example, the user can first select the tabular view mouse gesture (B1) and then select the time line view mouse gesture (B2) to see different models of Nikon cameras ordered by their release times. The user can use a slider bar to compare features of models that were released around the same time.

Figure 8:
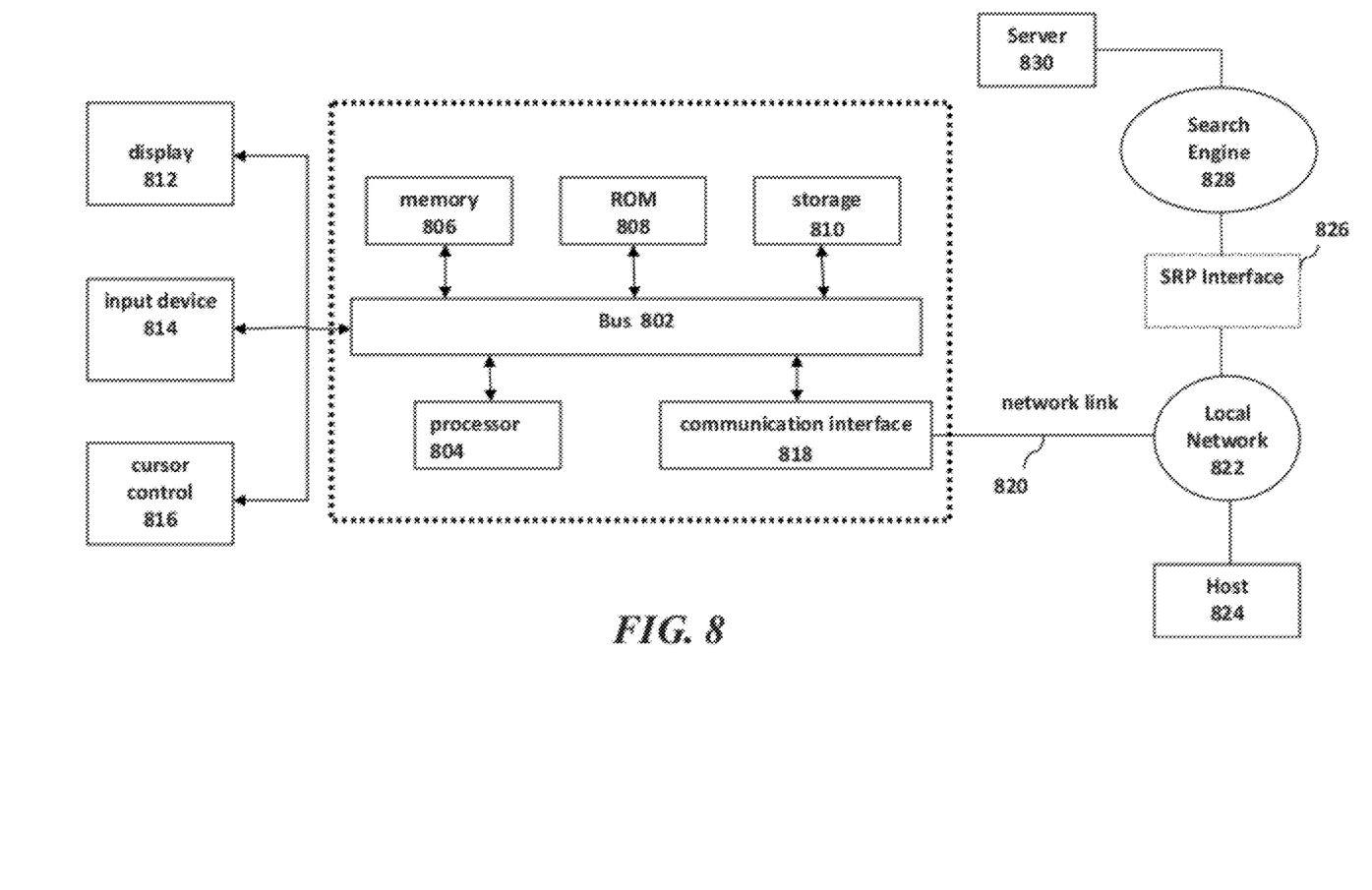
FIG. 8 is a high level block diagram showing an information processing system configured according to an embodiment of the present invention.

Referring now to FIG. 8 there is shown a high-level block diagram illustrating an information processing system 800 upon which an embodiment of the present invention may be implemented. System 800 includes a bus 802 or other communication mechanism for communicating information, and one or more processors, such as processor device 804 coupled with bus 802 for processing information. System 800 also includes a main memory 806, such as a random access memory (RAM) or other dynamic storage device, coupled with bus 802 for storing information and instructions to be executed by processor device 804. Main memory 806 also may be used for storing temporary variables or other intermediate information during execution of instructions to be executed by process device 804. System 800 further includes, inter alia, a read only (ROM) memory 808 or other static storage device, coupled with bus 802 for storing static information and instructions for processor device 804. A storage device 810, such as a magnetic disk or optical disk, is provided and coupled with bus 802 for storing information and instructions.

System 800 is operatively coupled with display 812, such as a computer monitor, for displaying information to the user. An input device 814, including alphanumeric and other keys, is also operatively coupled with the system 800. A cursor control device 816, such as a mouse, a trackball, or cursor direction keys is provided for communicating direction, information and command selections to processor 804 and for controlling cursor movement on display 812. This input device 814 typically has two degrees of freedom in two axes, a first axis (e.g. x) and a second axis (e.g. y) that allows the device to specify positions in a plane. The display 812 may also function as the input device such as in the touch-screen interfaces in the iPad™ and iPhone® mobile digital devices by Apple®, among others.

In an embodiment of the present invention, computer system 800 is used for implementing a search engine (or search engines) to produce optimized search results through embedded mouse gestures or alternate input actions. According to one embodiment of the invention, the search results page is optimized and provided by system 800 in response to processor device 804 executing one or more sequences of one or more instructions contained in memory 806. The SRP may be displayed on display 812. The user of computer system 800 uses the input device 814 to enter the search query and then relies on the cursor control device 816 to enter the mouse gestures.

System 800 also includes a communication interface 818 providing a two-way communication coupling with a network link 820 that is connected to a local network 822. Examples of a communications interface 818 may include a modem, a network interface (such as an Ethernet card), a communications port, a PCMCIA slot and card, etc. Software and data transferred via communications interface 818 are in the form of signals which may be, for example, electronic, electromagnetic, optical, or other signals capable of being received by communications interface 818. These signals are provided to communications interface 818 via a communications path (i.e., channel).

Network link 820 typically provides data communication through one or more networks to other devices. Network link 820 may provide a connection through local network 822 to a host computer 824 or to a web browser providing access, through the Internet to a Search Engine 828. According to an embodiment of the present invention, an SRP interface 826 is a layer between the user and the Search Engine 828, providing support for the receipt and processing of the mouse gestures or alternate inputs.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

In this document, the terms "computer program medium," "computer usable medium," and "computer readable storage medium" are used to generally refer to non-transitory media such as main memory and secondary memory, removable storage drive, a hard disk installed in hard disk drive, and others. These computer program products are means for providing software to the computer system. The computer readable storage medium allows the computer system to read data, instructions, messages or message packets, and other computer readable information from the computer readable medium.

Computer programs (also called computer control logic) are stored in main memory and/or secondary memory. Computer programs may also be received via communications interface. Such computer programs, when executed, enable the computer system to perform the features of the present invention as discussed herein. In particular, the computer programs, when executed, enable the processor to perform the features of the computer system. Accordingly, such computer programs represent controllers of the computer system.

What has been shown and discussed is a highly-simplified depiction of a programmable computer apparatus. Those skilled in the art will appreciate that other low-level components and connections are required in any practical application of a computer apparatus capable of performing the described invention.

Therefore, while there has been described what is presently considered to be the preferred embodiment, it will understood by those skilled in the art that other modifications can be made within the spirit of the invention. The above descriptions of embodiments is not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A method for performing a web search by a search engine, said method comprising:
   using a processor device, performing steps of:
   providing an interface embedded within available space of a first search results page served to a user in response to a search query, said embedded interface enabling the user's submission of an input action representing the user's query intent and desired search results presentation
   wherein the embedded interface is not visible to the user;
   receiving the input action directly from the embedded interface on the first search results page, comprising receiving a symbol generated by the user on the embedded interface;
   interpreting the input action as a command refining search results from the first search results page;
   reformulating the search query to incorporate the command represented by the input action, said reformulated search query to be executed directly from the first search results page; and
   providing a second search results page to the user in response to the reformulated search query;
   wherein when the symbol comprises a shape of a number seven, providing the second search results page comprises:
   retrieving a set of meta-data/attributes across the search results from the reformulated query; and
   generating a tabular view of the search results from the reformulated query, said tabular view comprising:
      meta-data/attributes common across the search results from the reformulated query, forming columns in the tabular view, and
      each search result forming a row in the tabular view.

2. The method of claim 1 wherein receiving the input action further comprises receiving at least one keyboard command on the embedded interface.

3. The method of claim 1 wherein the symbol is generated by the user directing movement of a cursor in a pattern such that the symbol is produced.

4. The method of claim 1 wherein the symbol is generated by the user haptically drawing a pattern on the embedded interface through a touch screen display.

5. The method of claim 1 wherein when the symbol comprises a shape of a question mark, providing the second search results page comprises presenting a question and answer discussion forum associated with the search query.

6. The method of claim 1 wherein when the symbol comprises a shape of a letter N, providing the second search results page comprises presenting a latest breaking news associated with the search query.

7. The method of claim 1 wherein when the symbol comprises a shape of a letter S, providing the second search results page comprises presenting a result selected from user contacts associated with the search query.

8. The method of claim 1 wherein when the symbol comprises a shape of a vertical line, providing the second search results page comprises presenting the user with an option of selecting attributes to further narrow the search results.

9. The method of claim 1 wherein providing the interface further comprises presenting a navigation bar.

10. A non-transitory computer readable storage medium having computer usable program code embodied therewith, the computer usable program code comprising instructions for:
    receiving a first search results page provided to a user in response to a search query;
    providing an embedded interface within available space of the first search results page, said interface enabling the user's submission of an input action representing the user's query intent and desired search results presentation;
    wherein the embedded interface is not visible to the user;
    receiving the input action directly from the embedded interface on the first search results page, comprising receiving a symbol generated by the user on the embedded interface;
    interpreting the input action as a command refining search results from the first search results page;
    reformulating the search query to incorporate the command represented by the input action, said reformulated search query to be executed directly from the first search results page; and
    providing a second search results page to the user in response to the reformulated search query;
    wherein when the symbol comprises a shape of a number seven, providing the second search results page comprises:
    retrieving a set of meta-data/attributes across the search results from the reformulated query; and
    generating a tabular view of the search results from the reformulated query, said tabular view comprising:
       meta-data/attributes common across the search results from the reformulated query, forming columns in the tabular view, and
       each search result forming a row in the tabular view.

11. The non-transitory computer readable storage medium of claim 10 wherein receiving the input action comprises receiving the symbol generated by directed cursor movement on the embedded interface of the first search results page.

12. The non-transitory computer readable storage medium of claim 10 wherein receiving the input action further comprises receiving a keyboard command on the embedded interface.

13. The non-transitory computer readable storage medium of claim 10 wherein receiving the input action comprises receiving a the symbol haptically drawn by the user on the embedded interface via a touch screen display.

14. The non-transitory computer readable storage medium of claim 10 wherein receiving the first search results page comprises receiving the first search results page from a search engine.

15. A computer system configured as a search engine for searching a database, said computer system comprising:
    a processor device performing steps of:
    receiving a first search results page provided to a user in response to a search query;
    providing an embedded interface within available space of the first search results page, said embedded interface enabling the user's submission of an input action representing the user's query intent and desired search results presentation;
    wherein the embedded interface is not visible to the user;
    receiving the input action directly from the embedded interface on the first search results page, comprising receiving a symbol generated by the user on the embedded interface;
    interpreting the symbol as a command refining search results from the first search results page;
    reformulating the search query to incorporate the command represented by the symbol, said reformulated search query to be executed directly from the first search results page; and providing a second search results page to the user in response to the reformulated search query;

wherein when the symbol comprises a shape of a number seven, providing the second search results page comprises:
 retrieving a set of meta-data/attributes across the search results from the reformulated query; and
 generating a tabular view of the search results from the reformulated query, said tabular view comprising:
  meta-data/attributes common across the search results from the reformulated query, forming columns in the tabular view, and
  each search result forming a row in the tabular view.

16. The computer system of claim 15 further comprising: the embedded interface, wherein said embedded interface is configured for receiving the input action in a form of the symbol generated by directed cursor movement on the first search results page.

17. The computer system of claim 15 further comprising a touch screen display.

* * * * *